United States Patent
Meyer (10) Patent No.: US 6,241,068 B1
(45) Date of Patent: Jun. 5, 2001

(54) SHIFT LEVER ASSEMBLY WITH A PRE-LOAD RELEASABLE INTERLOCK

(75) Inventor: Klemens J. Meyer, Northville, MI (US)

(73) Assignee: Teleflex Incorporated, Plymouth Meeting, PA (US)

( * ) Notice: Subject to any disclaimer, the term of this patent is extended or adjusted under 35 U.S.C. 154(b) by 0 days.

(21) Appl. No.: 09/440,628

(22) Filed: Nov. 15, 1999

(51) Int. Cl.$^7$ ................................................ B60K 41/26
(52) U.S. Cl. ........................................................ 192/220.4
(58) Field of Search ............................ 192/220, 220.2, 192/220.3, 220.4, 220.5

(56) References Cited

U.S. PATENT DOCUMENTS

| | | |
|---|---|---|
| 4,096,930 | 6/1978 | Viscardi . |
| 4,884,668 | * 12/1989 | Kobayashi et al. ............... 192/4 A |
| 4,887,702 | 12/1989 | Ratke et al. . |
| 4,917,224 | 4/1990 | Gokee . |
| 4,932,493 | 6/1990 | Sakurai et al. . |
| 4,934,496 | * 6/1990 | Barske et al. .................... 192/4 A |
| 4,936,431 | 6/1990 | Shinpo . |
| 4,976,171 | 12/1990 | Sharp et al. . |
| 4,986,399 | 1/1991 | Gokee . |
| 4,987,968 | 1/1991 | Martus et al. . |
| 5,014,831 | 5/1991 | Wawra et al. . |
| 5,018,610 | 5/1991 | Rolinski et al. . |
| 5,025,678 | 6/1991 | Shinpo et al. . |
| 5,027,929 | 7/1991 | Ratke et al. . |
| 5,027,931 | 7/1991 | Ratke et al. . |
| 5,029,680 | * 7/1991 | Kobayashi et al. ............... 192/4 A |
| 5,031,737 | 7/1991 | Dzioba et al. . |
| 5,062,509 | 11/1991 | Carpenter et al. . |
| 5,076,114 | 12/1991 | Moody . |
| 5,078,242 | 1/1992 | Ratke . |
| 5,129,494 | 7/1992 | Rolinski et al. . |
| 5,176,231 | 1/1993 | Moody et al. . |
| 5,181,592 | 1/1993 | Pattock . |
| 5,211,271 | 5/1993 | Osborn et al. . |
| 5,251,723 | 10/1993 | Rolinski et al. . |

(List continued on next page.)

OTHER PUBLICATIONS

Commercial activity statement and supporting documents.

*Primary Examiner*—Charles A Marmor
*Assistant Examiner*—Saúd Rodríguez
(74) *Attorney, Agent, or Firm*—Howard & Howard (57) ABSTRACT

A shift lever assembly (12) for a vehicle transmission (16) includes a housing (30), a selector lever (22) pivotally mounted with respect to the housing (20), a detent member (34), and a pawl (38). The selector lever (22) defines a longitudinal lever axis (66) along which a shift force is applied to selectively shift the transmission (16) between a plurality of shift positions. The detent member (34) is fixed with respect to the housing (30) and defines a plurality of detent gates (36) corresponding to the shift positions. The pawl (38) is mounted for movement with the selector lever (22) in and out of the detent gates (36). A roller assembly (76) is mounted to one end of the selector lever (22) and engages a stop (68). When the pawl (38) is in the park position and vehicle braking system (18) is not applied, the stop (68) prevents the lever (22) from moving longitudinally along the longitudinal lever axis (66). When a shift force is applied to the lever (22) before the braking system (18) is activated, the pawl (38) is pre-loaded against the detent gate (36). The assembly (12) includes an electromagnetic actuator (56) for disengaging the lever (22) from the stop (68) when the vehicle braking system (18) activated. The actuator (56) applies a secondary force to the lever (22) along a path that intersects the longitudinal lever axis (66). The actuator (56) can disengage the lever (22) to allow the pawl (38) to be shifted out of park even when the pawl (38) is under pre-load.

16 Claims, 5 Drawing Sheets

U.S. PATENT DOCUMENTS

| | | |
|---|---|---|
| 5,289,907 | 3/1994 | Pattock . |
| 5,489,246 | 2/1996 | Moody et al. . |
| 5,511,641 | 4/1996 | Snell et al. . |
| 5,588,514 | 12/1996 | Snell . |
| 5,647,465 | 7/1997 | Burkhard et al. . |
| 5,647,818 | 7/1997 | Moody . |
| 5,671,638 * | 9/1997 | Hattori et al. .................. 192/4 A X |
| 5,729,187 | 3/1998 | Moody et al. . |

* cited by examiner

SHIFT LEVER ASSEMBLY WITH A PRE-LOAD RELEASABLE INTERLOCK

TECHNICAL FIELD

The subject invention relates generally to a shift lever assembly for a vehicle transmission. Specifically, the shift lever assembly includes an interlock mechanism that allows the shift lever to move out of a park position under pre-load conditions.

BACKGROUND OF THE INVENTION

The invention relates to a shift lever assembly used to shift a vehicle transmission between a plurality of shift positions. The invention is particularly directed to providing a shift lever assembly with an interlock that operates under pre-load conditions.

Brake transmission safety interlock (BTSI) systems are used to ensure that a vehicle braking system is activated before the transmission can be shifted out of a park position. In the prior art, BTSI systems typically include a shift lever device with a solenoid, a shift cable extending from the shift lever to the vehicle transmission, and an electromechanical device in electrical communication with the vehicle braking system and in mechanical communication with the shift cable. When the vehicle is in park and the vehicle braking system is at rest, the shift lever cannot be shifted out of park, and thus the shift cable cannot shift the transmission out of park. When the vehicle is in park and the vehicle braking system is activated, the shift lever can be moved out of park, causing the shift cable to shift the transmission.

One problem with such prior art BTSI systems is pre-load release. A pre-load release condition exists when an operator tries to shift out of park without first applying the brakes. The locking mechanism in the BTSI system is thus placed under load. As long as the operator maintains the shift load, the locking mechanism will fail to release and allow shifting even if the brakes are subsequently applied. In order to release the locking mechanism, the operator must remove the initial shift load, apply the brakes, and then shift out of park.

An example of a BTSI system with pre-load release is shown in U.S. Pat. No. 5,176,231. This system utilizes a solenoid with a plunger that is used to engage a notch having an S-shaped sigmoidal wall in a shift cable assembly. When the plunger is vertically extended into the notch, the cable does not move, and the transmission cannot be shifted. When the braking system is activated and the plunger is removed from the notch, the cable can move and the transmission can be shifted. Interaction of the plunger and the S-shaped sigmoidal wall of the notch allow shifting out of park under pre-load conditions.

BTSI systems such as these are difficult to package and install because the interlock mechanism is interacting directly with the shift cable. Shift cables are difficult to route through vehicles and the addition of an interlock mechanism on the cable further increases installation difficulties. Also, failures in interlock mechanism such as these can be difficult to service depending on where the interlock is mounted to the shift cable. The present invention provides a shift lever assembly for a BTSI system with an interlock that interacts directly with the selector lever and which can shift out of park even under pre-load conditions. The shift lever assembly is also easy to install and maintain.

SUMMARY OF THE INVENTION AND ADVANTAGES

A shift lever assembly for a vehicle transmission includes a housing and a detent supported within the housing, and a selector lever. The detent is selectively movable between a plurality of shift positions. The selector lever defines a longitudinal lever axis and is pivotally mounted with respect to the housing to move the detent between the shift positions. A stop engages a portion of the lever to prevent the lever from moving longitudinally along the axis. The assembly is characterized by including an actuator that moves the lever tangentially to the stop. This allows the lever to move along the longitudinal lever axis when a pre-determined condition is met, resulting in the detent moving from a first shift position to a second shift position.

Preferably, the selector lever is prevented from moving out of a park shift position until the vehicle brakes are applied. In a preferred embodiment, the detent is comprised of a fixed member with a plurality of detent gates corresponding to the shift positions and a pawl mounted to the selector lever for movement into and out of the detent gates. Sometimes, a shift force is applied to the selector lever before the brakes are applied causing a pre-load condition between the pawl and the detent gate. In the preferred embodiment, the selector lever includes a roller mounted to one end that engages the stop. The actuator can move the lever tangentially to the stop when the brakes are applied even when the pawl is under a pre-load condition.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

The subject invention as shown in FIGS. 1–7 relates to a shift lever assembly that includes an interlock mechanism for allowing a selector lever to move out of a park position under pre-load conditions.

Figure 1:
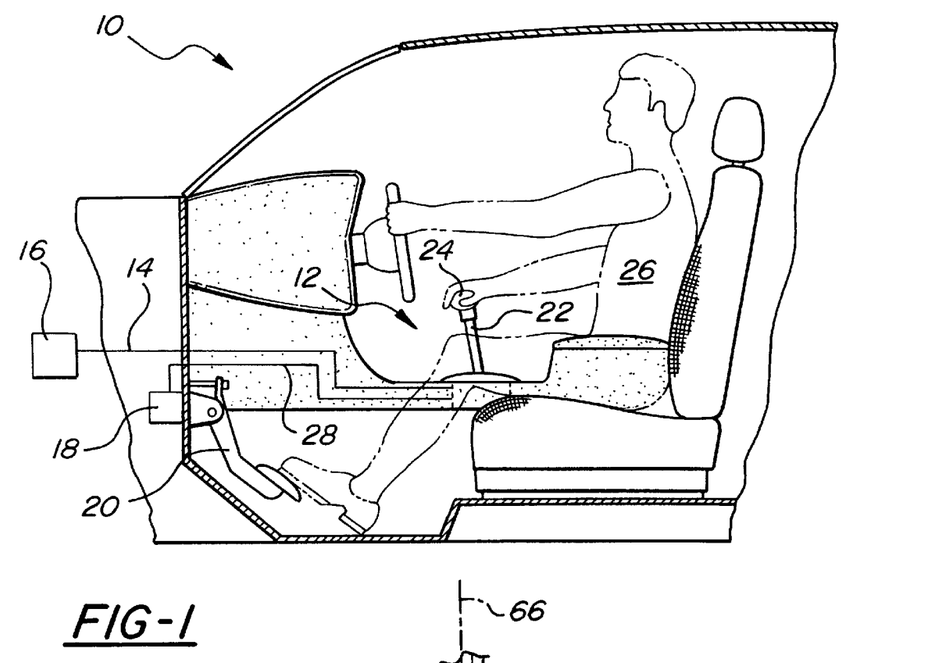
FIG. 1 is a side schematic view of a shift lever assembly in a vehicle.

Referring to the Figures, wherein like numerals indicate like or corresponding parts throughout the several views, a vehicle 10 incorporating the subject shift lever assembly, shown generally at 12 in FIG. 1. The shift lever assembly 12 is connected via a shift cable or other push-pull mechanism 14 to a vehicle transmission 16. The vehicle 10 also includes a braking system, shown schematically at 18, which is activated by applying a force to a brake pedal 20. The shift lever assembly 12 is controlled by a selector lever 22 having a push button 24 or other mechanical actuator mounted at one end.

The selector lever 22 is movable between a plurality of shift positions, such as PARK, REVERSE, NEUTRAL, DRIVE, THIRD, SECOND, and FIRST, for example. To shift the transmission 16 from the PARK position to the DRIVE position, a vehicle operator 26 must press the button 24 on the lever 22 and move the lever 24 from PARK to DRIVE. However, the transmission 16 cannot be shifted out of PARK until the braking system 18 has been activated by depressing the brake pedal 20. Once the braking system 18 has been activated, a signal 28 is sent to the shift lever assembly 12 indicating that conditions are proper for shifting out of PARK.

A pre-load release condition exists when the operator 26 tries to shift out of PARK without first applying the brake pedal 20. This applies a pre-load to an interlock mechanism in the lever 22. As long as the operator 26 maintains the shift pre-load, the interlock mechanism will fail to release and allow shifting even if the brake pedal 20 is subsequently applied. Usually, in order to release the interlock mechanism, the operator 26 must remove the initial shift pre-load, apply the brake pedal 20, and then shift out of PARK. However, the interlock mechanism of the subject shift lever assembly 12 is able to release and shift out of PARK even under pre-load conditions.

Figure 2:
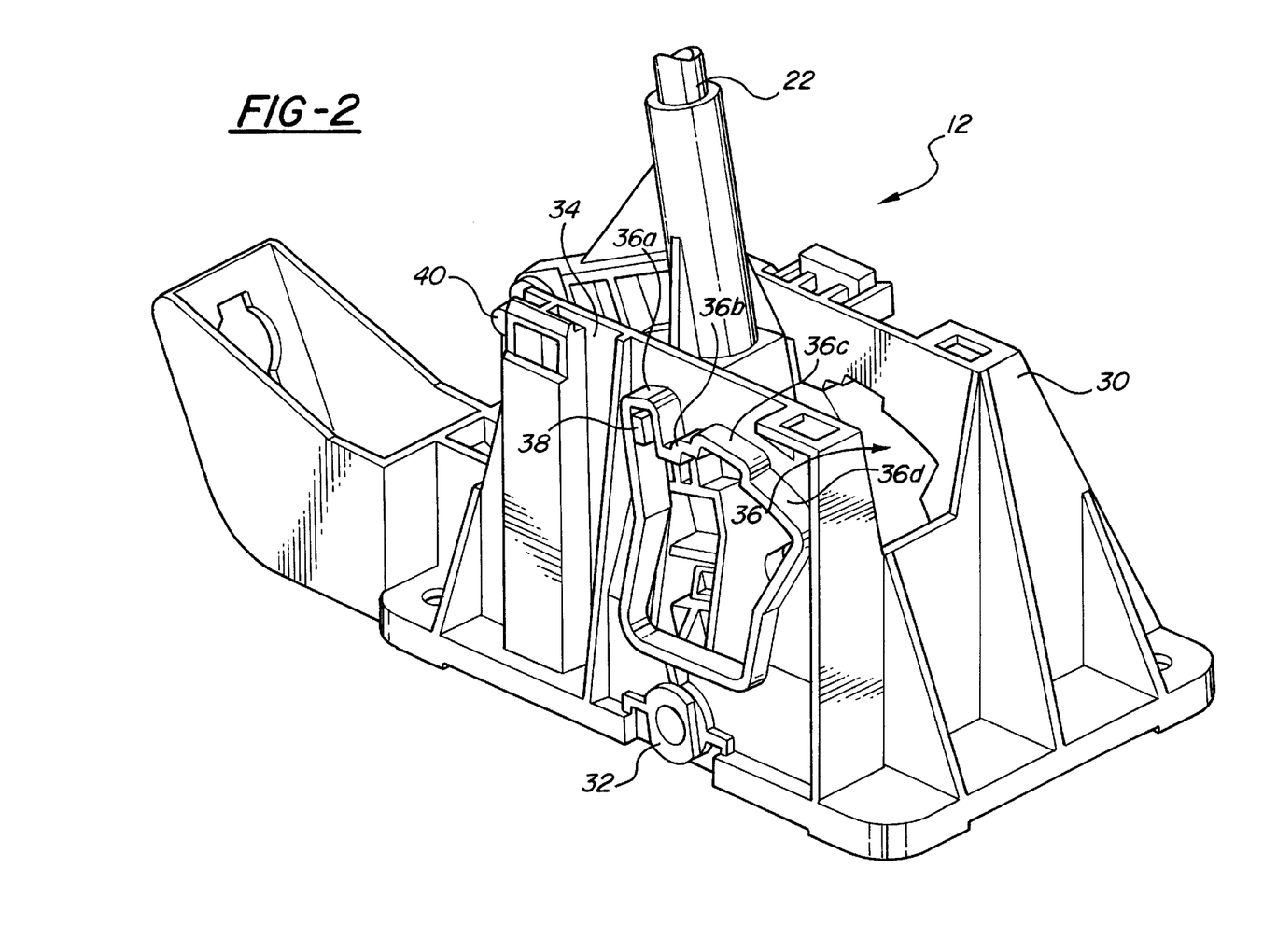
FIG. 2 is a partially broken, perspective view of the subject invention.

The shift lever assembly 12, shown in FIG. 2, includes a housing 30 that is mountable to a vehicle structure such as a console, dash, or frame member. The housing 30 can be made from steel or plastic and can be formed as a single piece or formed from multiple pieces that are fastened, joined, or snapped together. The selector lever 22 is pivotally mounted within the housing 30 on a pivot member 32.

The housing 30 includes a detent portion 34 that defines a plurality of detent gates 36 that correspond to the shift positions PARK 36a, REVERSE 36b, NEUTRAL 36c, and DRIVE 36d. It should be understood that the DRIVE position 36d can be comprised of various shift positions including OVERDRIVE, THIRD, SECOND, and FIRST. Preferably the housing includes two (2) detent portions 34, one located on each side of the selector lever 22. A pawl 38 interacts with the gates 36 when the transmission 16 is shifted between shift positions. The shift cable 14 is attached to the housing 30 via a stud, bolt, or other fastener 40.

Figure 3:
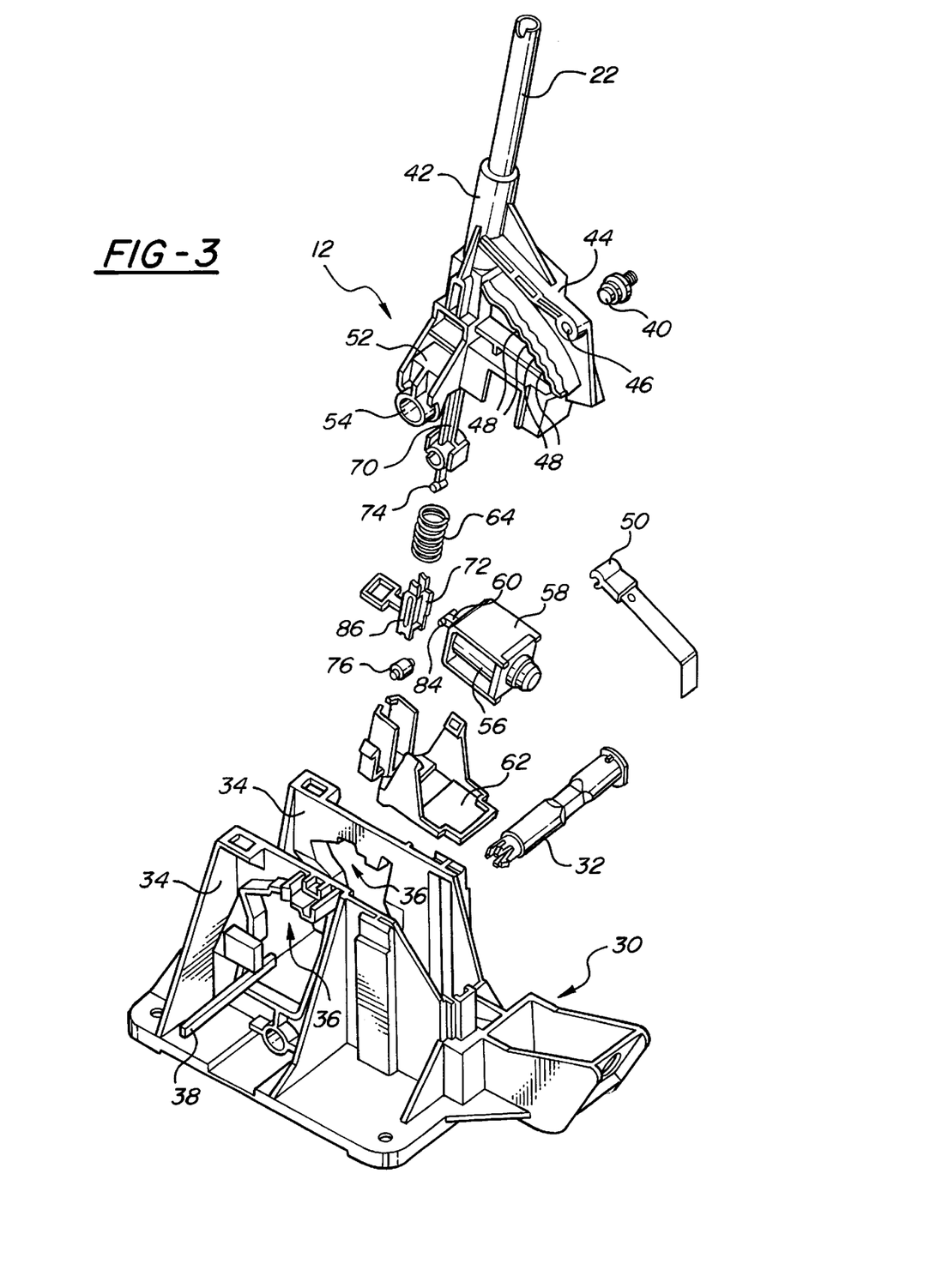
FIG. 3 is an exploded view of the invention shown in FIG. 2.

A lever housing 42 is preferably fixed for movement with the selector lever 22, shown in FIG. 3, and is mounted between the detent portions 34 of the housing 30. The lever housing 42 includes a rearwardly extending portion 44 that defines a hole 46 for receiving the cable attachment stud 40. The lever housing 42 also includes a plurality of curved pockets 48 that interact with a roll pin 50 to provide a shift feel to the operator 26 as the selector lever 22 is moved between the shift positions.

The pivot member 32 is preferably a pivot bolt that is fixed to the housing 30 underneath the selector lever 22. The selector lever housing 42 includes a lower portion 52 that defines an annular bearing surface 54 for receiving the pivot bolt 32. The selector lever 22 pivots about the pivot bolt 32 as the pawl 38 is moved into and out of the detent gates 36.

The shift lever assembly 12 also includes an actuator 56 that is used to apply a force to the selector lever 22 which allows the pawl 38 to shift out of the park gate detent 36a when the brake pedal 20 is applied The actuator 56 is preferably an electromagnetic solenoid that is well known in the art. The actuator 56 includes a main body 58 and a plunger 60 that is extended outwardly from the main body 58 when the solenoid is energized. The actuator is preferably mounted to the shift lever assembly 12 via at least one bracket 62.

Figure 4:
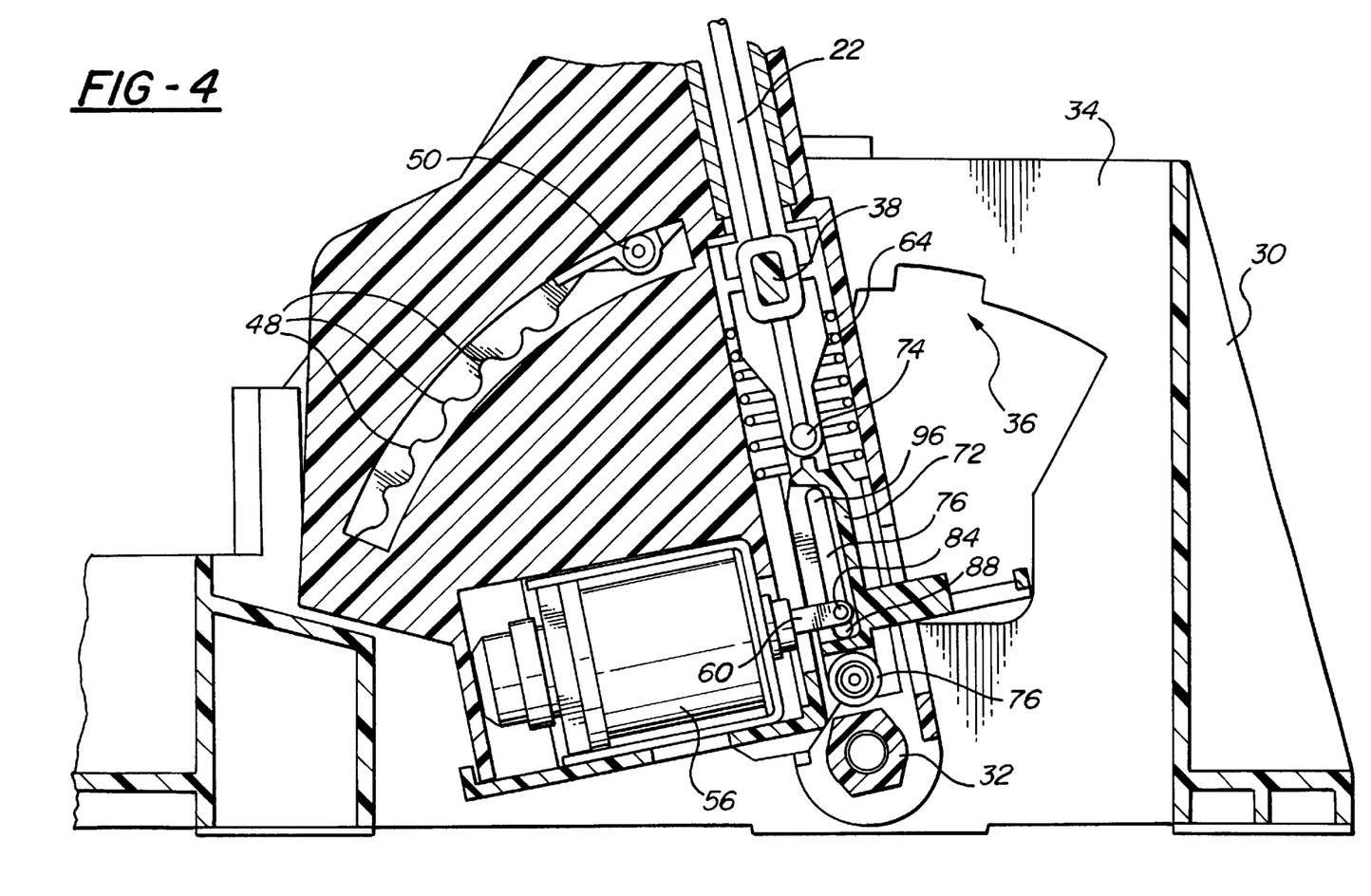
FIG. 4 is a side cross-sectional view, partially broken away, of the subject invention.

The shift lever assembly 12 includes a return spring 64 that is biased to return the selector lever 22 upwardly when the pawl is shifted from one of the operable shift positions to the park shift position. The return spring 64 is preferably coiled around the selector lever 22 as shown in FIG. 4.

Figure 5:
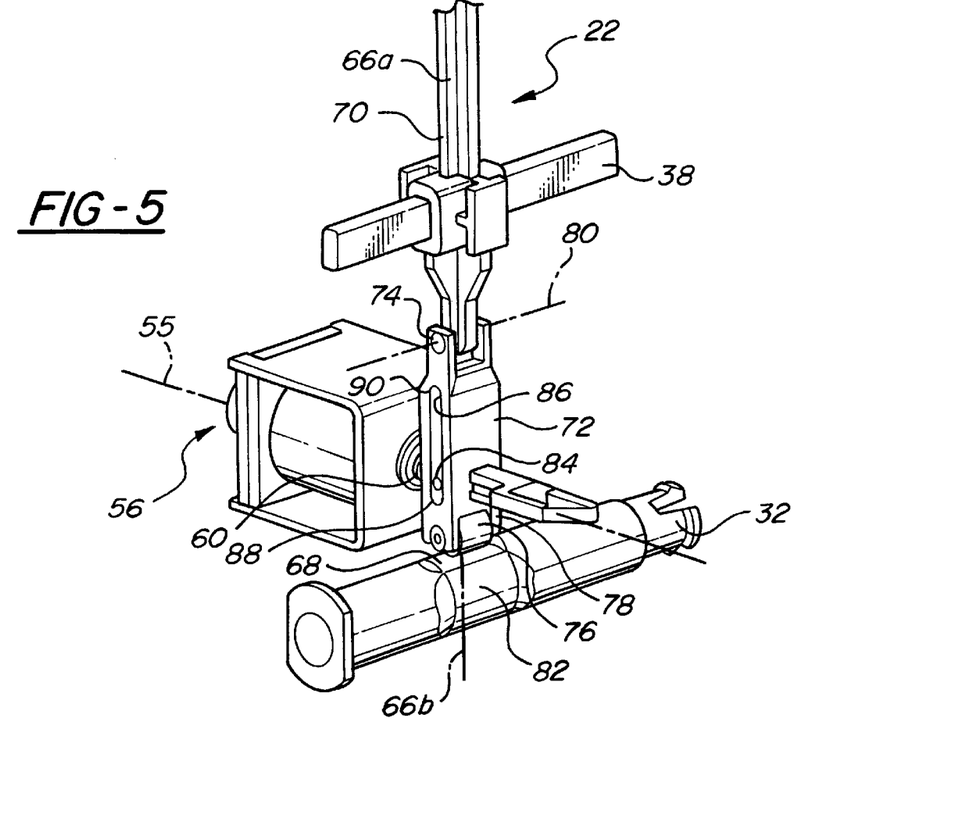
FIG. 5 is a partial perspective view of the invention when the solenoid is in a deactivated condition.
Figure 6:
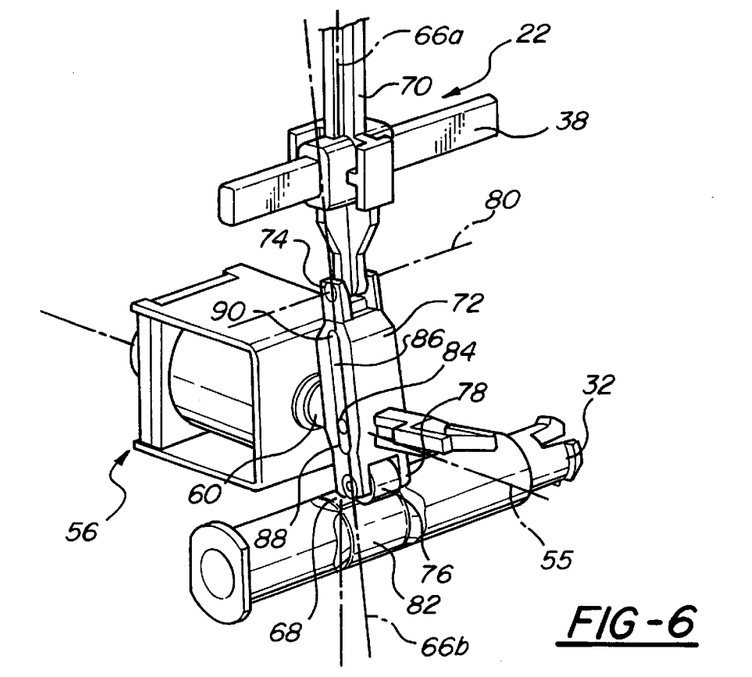
FIG. 6 is a view like FIG. 5 when the solenoid has been moved to a partially extended position.
Figure 7:
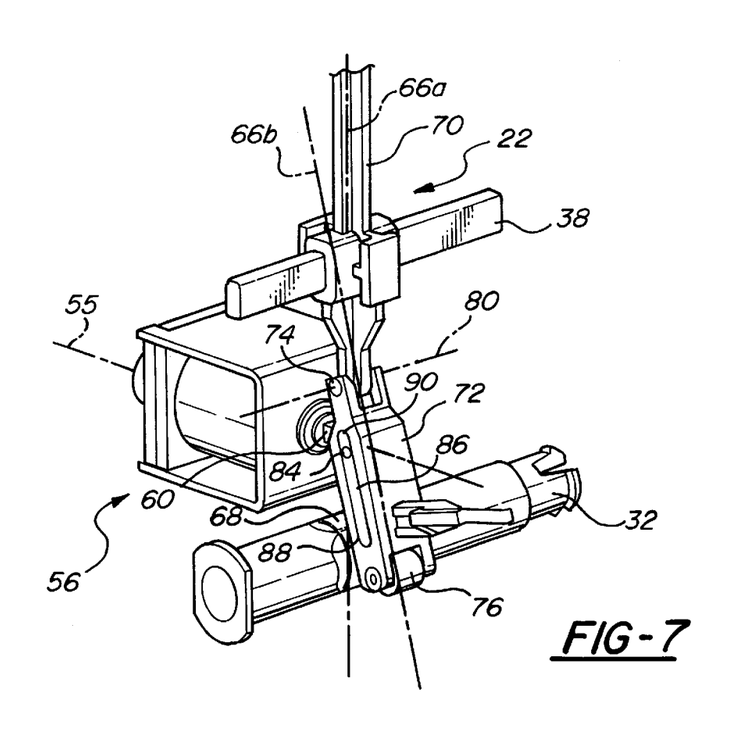
FIG. 7 is a view like FIG. 5 when the solenoid has been moved to a fully extended condition.

The operation of the shift lever assembly 12 is shown in FIGS. 5–7. The selector lever 22 defines a longitudinal lever axis 66 along which the lever 22 moves when the button 24 is pushed by the operator 26 (FIG. 1). As shown in FIG. 5, a stop 68 engages a portion of the lever 22 to prevent the lever 22 from moving longitudinally along the axis 66 until the brake pedal 20 is depressed. The stop 68 is preferably formed as the top surface of the pivot bolt 32. The actuator 56 extends the plunger 60, moving the lever 22 tangentially with respect to the stop 68 to allow the lever 22 to move along the longitudinal lever axis 66 when the brake pedal 20 is depressed, see FIG. 6. When the plunger 60 is fully extended, see FIG. 7, the pawl 38 is moved out of the park detent gate 36a position. Thus, the actuator 56 is movable between two positions. In the de-energized position, when the vehicle braking system 18 is at rest, the lever 22 engages the stop 68 and the plunger 60 is in a fully retracted position. In the energized position, the vehicle braking systems 18 is activated and the lever 22 is disengaged from the stop 68 by the fully extended plunger 60.

As discussed above, the operator 26 applies a shift force to the selector lever 22 along the longitudinal lever axis 66. If this shift force is applied before the braking system 18 is activated, the pawl 38 is placed under a pre-load and is bound up against the park detent gate 36a. Thus, the frictional forces between the pawl 38 and the detent gate 36a are increased. The actuator 56 applies a secondary force along a path 55 that intersects the longitudinal lever axis 66 to overcome the binding frictional forces to release the pawl 38 from the PARK shift position. Preferably, the actuator 56 applies the secondary force in a path 55 that is perpendicular to the longitudinal lever axis 66 when the vehicle braking system 18 is activated, however, other angular orientations could also be used.

In the preferred embodiment, the selector lever 22 is comprised of an upper rod 70 pivotally connected to a lower rod 72 by a pivot shaft 74. The selector lever 22 also includes a roller 76 mounted to a distal end 78 of the lower rod 72. The roller 76 engages the stop 68 when the pawl 38 is in the PARK shift position. The upper rod 70 defines a first portion 66a of the longitudinal lever axis 66 and the lower rod 72 defines a second portion 66b of the longitudinal lever axis 66. The first 66a and second 66b portions are collinear when the actuator 56 is in the de-energized position and are non-collinear when the actuator 56 is in the energized position. When the operator 26 applies a shift force before the brake pedal 20 is depressed, the shift force is applied along the longitudinal lever axis 33 in a vertical direction against the stop 68. The selector lever 22 cannot move downwardly because the stop 68 prevents further vertical movement by the lever 22. When the brake pedal 20 is depressed the signal 28 is sent to the actuator 56 to activate the plunger 60. The plunger 60 moves outwardly to engage the lower rod 72. The secondary force applied by the actuator 56 against the lower rod 72, causes the roller 76 to roll tangentially along the upper surface of the pivot member. At the same time, the lower rod 72 is pivoting with respect to the upper rod 70 about a pivot axis 80 defined by the pivot shaft 74. The pivot axis 80 is preferably orientated transversely with respect to the longitudinal lever axis 66. As the top surface of the pivot member 32 ends, the roller 56 moves downwardly along a side surface of the pivot member 32 allowing the upper lever 70 to be moved vertically downward. This allows the pawl 38 to be moved downwardly to be released from the PARK shift position.

As discussed above, the stop 68 is comprised of the pivot member 32 which has a generally flat upper surface for engaging the roller 76 when the actuator 56 is de-energized. Preferably, the pivot member 32 is cylindrical in shaft and has a plurality of beveled side surfaces 82 adjacent to the flat upper surface. As the plunger 60 is moved against the lower rod 72, the roller 76 moves from the flat upper surface to the beveled side surfaces 82 allowing the pawl 38 to be shifted out of the PARK shift position.

In the preferred embodiment, the plunger 60 is operably connected to a guide pin 84 and the lower rod 72 includes a longitudinally extending slot 86 for receiving the guide pin 84. When the actuator 56 is de-energized and the roller 76 is engaged with the stop 68, the guide pin 84 is positioned in a lower portion 88 of the slot 86. When the actuator is energized, the guide pin 84 is slid upwardly along the slot 86. When the plunger 60 is fully extended, see FIG. 7, the guide pin 84 is positioned in an upper portion 90 of the slot 86. When the guide pin 84 is in this position, the roller 76 is disengaged from the stop 68 and the pawl 38 can be shifted out of PARK.

When a pre-load force is applied to the selector lever 22 and the frictional forces are increased between the pawl 38 and the detent gate 36a. The selector lever 22 can shift the pawl out of PARK without having to release the initial shift force first. If the operator 26 maintains the pre-load, the pawl 38 can be easily shifted out of PARK when the brake pedal 20 is subsequently depressed. This pre-load release feature is accomplished by two piece selector lever with the upper rod 70 pivotally connected to the lower rod 72 and the interaction of the roller 76 and pivot member 32. The linear secondary force applied by the actuator 56 against the lower rod 72 pivots the lower rod 72 with respect to the upper rod 70 and rolls the roller 56 away from the stop surface 68. This allows the pawl 38 to be shifted out of PARK. Thus, the subject shift lever assembly 12 provides a simple and effective mechanism for shifting under pre-load conditions.

The invention has been described in an illustrative manner, and it is to be understood that the terminology that has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A shift lever assembly (12) for a vehicle transmission (16) comprising:
  a housing (30);
  a detent supported within said housing (30) and selectively movable between a plurality of shift positions;
  a selector lever (22) defining a longitudinal lever axis (66) and pivotally mounted with respect to said housing (30) to move said detent between said shift positions;
  a stop (68) engaging a portion of said lever (22) to prevent said lever (22) from moving longitudinally along said axis (66);
  an actuator (56) for moving said lever (22) tangentially to said stop (68) to allow said lever (22) to move along said longitudinal lever axis (66) when a pre-determined condition is met, resulting in said detent moving from a first shift position to a second shift position a shift force is applied to said lever (22) along said longitudinal lever axis (66) causing said detent to experience a binding shift load and wherein said actuator (56) applies a secondary force along a path that intersects said longitudinal lever axis (66) to overcome said binding shift load and release said detent from said first shift position.

2. An assembly as set forth in claim 1 wherein said selector lever (22) is comprised of an upper rod (70) pivotally connected to a lower rod (72) and a roller (76) mounted to a distal end (78) of said lower rod (72), said roller (76) for engaging said stop (68).

3. An assembly as set forth in claim 2 wherein said pre-determined condition is defined as the activation of a vehicle braking system (18) such that said actuator (56) is movable between a first position where the vehicle braking system (18) is at rest and said lever (22) engages said stop (68) and a second position where the vehicle braking system (18) is activated and said lever (22) is disengaged from said stop (68).

4. An assembly as set forth in claim 3 wherein said upper rod (70) defines a first portion (66a) of said longitudinal lever axis (66) and said lower rod (72) defines a second portion (66b) of said longitudinal lever axis (66), said first (66a) and second (66b) portions being collinear when said actuator (56) is in said first position and being non-collinear when said actuator (56) is in said second position.

5. An assembly as set forth in claim 4 wherein said stop (68) is comprised of a pivot member (32) having a generally flat upper surface for engaging said roller (76) when said actuator (56) is in said first position and at least one beveled surface (82) adjacent to said upper surface for engaging said roller (76) when said actuator (56) is in said second position.

6. An assembly as set forth in claim 5 wherein said at least one beveled surface (82) is comprised of a plurality beveled surfaces sequentially engaged by said roller (76) as said actuator (56) is moved from said first position to said second position.

7. An assembly as set forth in claim 5 wherein said detent is comprised of a fixed member (34) with a plurality of detent gates (36) corresponding to said shift positions and a pawl (38) mounted to said selector lever (22) for movement into and out of said detent gates (36).

8. An assembly as set forth in claim 3 wherein said actuator (56) is comprised of an electromagnetic solenoid with a plunger (60) that linearly engages said lower rod (72) causing said lower rod (72) to pivot about said upper rod (70) as said actuator (56) is moved from said first position to said second position.

9. A shift lever assembly (12) for a vehicle transmission (16) comprising:
  a housing (30);
  a selector lever (22) pivotally mounted with respect to said housing (30) and defining a longitudinal lever axis (66) along which a shift force is applied to selectively shift the transmission (16) between a plurality of shift positions;
  a detent member (34) fixed with respect to said housing (30) and defining a plurality of detent gates (36) corresponding to said shift positions;
  a pawl (38) mounted for movement with said selector lever (22) in and out of said detent gates (36);
  a stop (68) engaging a portion of said lever (22) to prevent said lever (22) from moving longitudinally along said longitudinal lever axis (66);
  said assembly characterized by including an electromagnetic actuator (56) for disengaging said lever (22) from said stop (68) when a vehicle braking system (18) is activated by applying a secondary force to said lever (22) along a path that intersects said longitudinal lever axis (66).

10. An assembly as set forth in claim 9 wherein said shift force is applied along said longitudinal lever axis (66) before the vehicle braking system (18) is activated, increasing frictional forces between said pawl (38) and said detent gate (36), and said actuator (56) applies said secondary force in a direction perpendicular to said longitudinal lever axis (66) when the vehicle braking system (18) is activated to overcome said frictional forces and release said pawl (38) from said detent gate (36).

11. An assembly as set forth in claim 9 including a roller (76) mounted to a lower end (78) of said selector lever (22) wherein said roller (76) engages said stop (68).

12. An assembly as set forth in claim 11 wherein said selector lever (22) is comprised of an upper rod (70) defining a first portion (66*a*) of said longitudinal lever axis (66) and a lower rod (72) defining a second portion (66*b*) of said longitudinal lever axis (66), said upper (70) and lower (72) rod being pivotally interconnected by a pivot shaft (74) defining a pivot axis (80) that is transverse to said longitudinal lever axis (66).

13. An assembly as set forth in claim 12 wherein said first (66*a*) and second (66*b*) portions of said longitudinal lever axis (66) are collinear when said roller (76) is engaged with said stop (68) and are non-collinear when said roller (76) is disengaged from said stop (68).

14. An assembly as set forth in claim 13 wherein said electromagnetic actuator (56) includes a plunger (60) for applying said secondary force against said lower rod (72) to pivot said lower rod (72) about said pivot axis (80).

15. An assembly as set forth in claim 14 wherein said plunger (60) is operably connected to a guide pin (84) and wherein said lower rod (72) includes a longitudinally extending slot (86) for receiving said guide pin (84), said guide pin (84) being positioned in a lower portion (88) of said slot (86) when said roller (76) is engaged with said stop (68) and being positioned in an upper portion (90) of said slot (86) when said roller (76) is disengaged from said stop (68).

16. An assembly as set forth in claim 11 wherein said stop (68) is comprised of a pivot member (32) mounted below said selector lever (22) and presenting a generally flat upper surface and a plurality of beveled side surfaces (82) and wherein said roller (76) engages said upper surface when said selector lever (22) is in a PARK shift position and the vehicle braking system (18) is deactivated, and said roller (76) engages said side beveled surfaces (82) when the vehicle braking system (18) is activated to allow said selector lever (22) to be moved out of the PARK position.

\* \* \* \* \*